US010043418B2

(12) United States Patent
Napolitano et al.

(10) Patent No.: US 10,043,418 B2
(45) Date of Patent: Aug. 7, 2018

(54) MARKING SYSTEM AND METHOD AND SCRATCH-OFF GAME CARD INCORPORATING SAME

(75) Inventors: Thomas J. Napolitano, East Greenwich, RI (US); William John Miller, Lithia, FL (US); Dinah Ann George, Lakeland, FL (US); John Louis Capone, East Greenwich, RI (US); Ross Dalton, East Greenwich, RI (US)

(73) Assignee: IGT Global Solutions Corporation, Providence, RI (US)

( * ) Notice: Subject to any disclaimer, the term of this patent is extended or adjusted under 35 U.S.C. 154(b) by 2314 days.

(21) Appl. No.: 12/611,787

(22) Filed: Nov. 3, 2009

(65) Prior Publication Data

US 2010/0045026 A1 Feb. 25, 2010

Related U.S. Application Data

(60) Provisional application No. 61/274,107, filed on Jun. 16, 2009.

(51) Int. Cl.
*A63B 71/00* (2006.01)
*A63F 3/06* (2006.01)
(Continued)

(52) U.S. Cl.
CPC ............ *G09F 3/0292* (2013.01); *A63F 3/062* (2013.01); *A63F 3/065* (2013.01); *B41M 3/005* (2013.01); *A63F 3/0665* (2013.01)

(58) Field of Classification Search
CPC . B42D 1/00; B42D 19/00; B42D 3/18; B42D 15/00; B42D 15/10; B42D 15/025;
(Continued)

(56) References Cited

U.S. PATENT DOCUMENTS 4,168,088 A * 9/1979 Somlyody ....................... 283/93
4,591,190 A 5/1986 Clark
(Continued)

FOREIGN PATENT DOCUMENTS

AU 703019 B2 3/1999
AU 703019 B2 3/1999
(Continued)

OTHER PUBLICATIONS

International Search Report and Written Opinion, PCT Application No. PCT/US10/29224, dated May 26, 2010, U.S. Patent and Trademark Office.
(Continued)

*Primary Examiner* — Justin V Lewis
(74) *Attorney, Agent, or Firm* — Williams Mullen; Thomas F. Bergert

(57) ABSTRACT

A game card incorporates a marking system having one or more layers of varnish or rubber-based material that is removable when applied to a substrate and one or more overlying screens having a pattern of opaque ink elements printed on the removable layer or layers such that the ink elements are blended into smooth tones when viewed by the human eye. An optional underlying screen provides another pattern of opaque ink elements underneath the removable layer. The marking system and method of the present invention permit a wide range of combinations of designs and security measures, while ensuring that indicia printed on the game card are visible so that players can scratch or otherwise remove the removable layer and at least a portion of the overlying screen as a way of marking the underlying indicia. Whether the underlying screen is employed or not, once the removable layer is removed, the underlying indicia on the game card is surrounded by a background that is
(Continued)

visibly distinct from the color viewed when the removable layer is in place and has not been removed.

28 Claims, 5 Drawing Sheets

(51) Int. Cl.

| | |
|---|---|
| ***B42D 15/00*** | (2006.01) |
| ***B42D 15/10*** | (2006.01) |
| ***A63F 9/24*** | (2006.01) |
| ***A63F 13/00*** | (2014.01) |
| ***G06F 17/00*** | (2006.01) |
| ***G06F 19/00*** | (2018.01) |
| ***G09F 3/00*** | (2006.01) |
| ***B41M 3/00*** | (2006.01) |

(58) Field of Classification Search

CPC ....... B42D 25/27; G09F 3/0292; A63F 3/062; A63F 3/065; A63F 3/0665; B41M 3/005

USPC ..... 281/2, 5, 51; 283/61, 62, 72, 73, 94, 98, 283/100, 101, 108, 109, 117, 901, 903; 273/269, 139; 463/19

See application file for complete search history.

(56) References Cited

U.S. PATENT DOCUMENTS

| | | | | |
|---|---|---|---|---|
| 4,643,454 | A | 2/1987 | Ondis | |
| 4,736,966 | A | 4/1988 | Haddock et al. | |
| 5,114,735 | A | 5/1992 | Rua et al. | |
| 5,193,815 | A | 3/1993 | Pollard | |
| 5,544,881 | A | 8/1996 | Rua et al. | |
| 5,560,608 | A | 10/1996 | Silverschotz | |
| 5,667,250 | A | 9/1997 | Behm et al. | |
| 5,704,647 | A | 1/1998 | Desbiens | |
| 5,839,763 | A | 11/1998 | McCannel | |
| 5,865,470 | A | 2/1999 | Thompson | |
| 6,022,051 | A | 2/2000 | Casagrande | |
| 6,076,860 | A * | 6/2000 | Holman | A63F 3/062 283/109 |
| 6,106,932 | A | 8/2000 | Carides et al. | |
| 6,142,533 | A | 11/2000 | Borowski, Jr. | |
| 6,241,246 | B1 * | 6/2001 | Guttin | A63F 3/0665 273/138.1 |
| 6,357,799 | B1 | 3/2002 | Shibata et al. | |
| 6,358,607 | B1 | 3/2002 | Grotzner et al. | |
| 6,443,494 | B1 * | 9/2002 | Lieberman Zadjman et al. | 283/101 |
| 6,589,624 | B1 | 7/2003 | Lee | |
| 6,879,805 | B2 | 4/2005 | Epstein | |
| 6,889,978 | B2 | 5/2005 | Schaefer et al. | |
| 7,429,044 | B2 | 9/2008 | O'Brien | |
| 7,481,431 | B2 | 1/2009 | Miller et al. | |
| 7,530,570 | B2 | 5/2009 | Nulph et al. | |
| 7,976,068 | B2 * | 7/2011 | Wicker | B41M 3/14 283/902 |
| 2002/0003335 | A1 | 1/2002 | Schaefer et al. | |
| 2002/0029713 | A1 | 3/2002 | Morizumi et al. | |
| 2002/0047259 | A1 | 4/2002 | Lambert et al. | |
| 2003/0150762 | A1 | 8/2003 | Biller | |
| 2003/0151248 | A1 | 8/2003 | Kubert et al. | |
| 2003/0160445 | A1 | 8/2003 | Sheppard et al. | |
| 2003/0162580 | A1 | 8/2003 | Cousineau et al. | |
| 2004/0091680 | A1 | 5/2004 | Hill | |
| 2004/0150220 | A1 | 8/2004 | Holmes et al. | |
| 2005/0258634 | A1 | 3/2005 | Dronzek, Jr. et al. | |
| 2005/0230960 | A1 | 10/2005 | Bilodeau et al. | |
| 2007/0063432 | A1 | 3/2007 | Trudel et al. | |
| 2007/0215262 | A1 | 9/2007 | Taylor et al. | |
| 2007/0224398 | A1 | 9/2007 | Raksha et al. | |
| 2007/0243362 | A1 | 10/2007 | Gilbert | |
| 2007/0281224 | A1 | 12/2007 | Kirk et al. | |
| 2008/0042345 | A1 | 2/2008 | Stephens | |
| 2008/0042346 | A1 | 2/2008 | Martineck | |
| 2008/0070780 | A1 | 3/2008 | Morizumi et al. | |
| 2008/0119258 | A1 | 5/2008 | Perez et al. | |
| 2008/0131176 | A1 | 6/2008 | Snyder | |
| 2008/0191460 | A1 | 8/2008 | Blank | |
| 2009/0000733 | A1 | 1/2009 | Berndtsson | |
| 2009/0091122 | A1 | 4/2009 | Ogawa et al. | |
| 2010/0253063 | A1 * | 10/2010 | Skogster | 283/100 |

FOREIGN PATENT DOCUMENTS

| | | | |
|---|---|---|---|
| EP | 621061 | A1 * | 10/1994 |
| GB | 1580768 | | 12/1980 |
| GB | 1580768 | A | 12/1980 |
| WO | WO 9501821 | | 1/1995 |
| WO | WO 2009062297 | A1 * | 5/2009 |

OTHER PUBLICATIONS

Supplementary European Search Report, European Patent Application No. EP2296910, dated Sep. 30, 2011, European Patent Office.

Amendment, U.S. Appl. No. 09/208,228 of Stephen J. Holman et al., dated Oct. 15, 1999.

European Patent Office, Supplementary Search Report, dated Sep. 30, 2011.

Decision to grant a European Patent, European Patent Application No. EP2296910, dated Nov. 22, 2012, European Patent Office.

Communication regarding intention to grant a European Patent, European Patent Application No. EP2296910, dated Jul. 9, 2012, European Patent Office.

Applicant's Amendment, European Patent Application No. EP2296910, dated Feb. 6, 2012.

Notice of Acceptance, Australian Patent Application No. 2010241203, dated Aug. 2, 2012, Australian Patent Office.

Applicant's Response to Examiner's Second Examination Report, Australian Patent Application No. 2010241203, dated Jul. 6, 2012.

Examiner's Second Examination Report, Australian Patent Application No. 2010241203, dated Jun. 30, 2012, Australian Patent Office.

Applicant's Response to Examiner's First Examination Report, Australian Patent Application No. 2010241203, dated Jun. 19, 2012.

Examiner's First Examination Report, Australian Patent Application No. 2010241203, dated Nov. 21, 2011, Australian Patent Office.

* cited by examiner

MARKING SYSTEM AND METHOD AND SCRATCH-OFF GAME CARD INCORPORATING SAME

REFERENCE TO RELATED APPLICATIONS

The present application claims the benefit of U.S. application Ser. No. 61/274,107, filed Jun. 16, 2009 and entitled "Marking System and Method and Scratch-Off Game Card Incorporating Same," the disclosure of which is incorporated by reference herein in its entirety.

FIELD OF THE INVENTION

The present invention pertains to gaming, and more particularly to game cards or tickets having at least a portion thereof capable of being marked to distinguish played areas from unplayed areas.

BACKGROUND ART

Marking systems for game cards, such as instant lottery tickets and extended instant lottery games, such as Bingo and Crossword games, for example, are designed to allow a player to mark previously or currently called or played numbers, letters, or other indicia, and thereby distinguish them from uncalled or unplayed indicia. For example, if a Bingo game card includes five numbers associated with each letter in the word "Bingo", and the player's card contains the first called letter-number combination, such as "B-1", for example, a marking system would permit the player to somehow mark the "B-1" indicia on his or her card to show that it had been called and, thus, would be out of play. For validation purposes, it is important that the game indicia not be entirely spoiled or removed so that the card or ticket can be read if and when the player claims to have a winning card.

One of the most primitive marking systems involves the use of a pen or other writing implement to physically mark through or scratch over the called indicia. Others have developed more advanced marking systems, but these systems still suffer from disadvantages. For example, U.S. Pat. No. 5,193,815 to Pollard discloses the use of a removable translucent material which allows viewing of the symbols (i.e., Bingo numbers) printed below the material. When the removable layer is removed, the underlying layer is "visually distinct". This marking system utilizes a single translucent layer. Materials like frosted glass and some plastics are translucent. When light strikes a translucent material, only some of the light passes through them. The light does not pass directly through the materials. It changes direction and is scattered as it passes through. The Pollard patent discloses the use of translucent material in a way where the "number is visible through the layer" in addition to coloring the translucent layer to provide for the visual distinction when removed. The Pollard patent further discloses a colored layer provided over the substrate of the game card and underneath the translucent coating, which enables a player to see a visual distinction between portions of the colored layer that remain under the coating and portions of the colored layer where the coating has been removed.

U.S. Pat. No. 6,076,860 to Holman, et al., ("Holman") discloses the printing of a clear transparent layer which is removable and covered by a transparent colored layer made of a non-scratch off material. Removal of the clear transparent layer in turn removes the colored layer. The Holman marking solution utilizes multiple transparent layers. When light encounters transparent materials, almost if not all of it passes directly through the materials. Glass, for example, is transparent to all visible light. The color of a transparent object depends on the color of light it transmits. If green light passes through a transparent object, the emerging light is green; but, if the transparent layer is colored it will still allow the light to pass through, albeit with an emerging color that has been visibly changed.

The marking systems of Pollard and Holman can be difficult and expensive to implement. Further, the above are limited in their application of multiple colors or shades, appealing designs and security measures to cards or tickets, and permit the underlying indicia to be displayed with only a limited degree of sharpness and clarity. In addition, the prior art does not employ symbols, letters, words or other designs that are uniquely related to the theme of the game being played. Further, the prior art does not employ security marks that are difficult to reproduce.

SUMMARY OF THE PRESENT INVENTION

The present invention provides a marking system and method and a game card incorporating the same, whereby, in one embodiment, a removable layer of varnish or rubber-based material is applied to a substrate having indicia printed thereon, and one or more overlying screens comprising a pattern of opaque ink elements is printed on or otherwise applied to the removable layer such that the ink elements are blended into smooth tones when viewed by the human eye. The present invention can further include an optional underlying screen providing another pattern of opaque ink elements underneath the removable layer. The marking system and method of the present invention permit a wide range of combinations of colors, designs and security measures, while ensuring that indicia printed on the game card are visible so that players can scratch or otherwise remove the removable layer and at least a portion of the overlying screen as a way of marking the underlying indicia. The present invention further permits the underlying indicia to be viewed with greater clarity and image sharpness. Whether the underlying screen is employed or not, once the removable layer is removed, the underlying indicia on the game card is surrounded by a background that is visibly distinct from the color viewed when the removable layer is in place and has not been removed. Further, the present invention can allow for different densities of elements, which can create shades of the same color.

One implementation of a method in accordance with the present invention comprises printing indicia on a game card, printing at least one removable layer on the card so as to cover at least a portion of the printed indicia, and printing at least one overlying screen comprising a pattern of opaque ink elements on the removable layer(s) such that the ink elements are blended into smooth tones when viewed by the human eye and allow the indicia to be at least partially visible.

DETAILED DESCRIPTION OF INVENTION EMBODIMENTS

Figure 1:
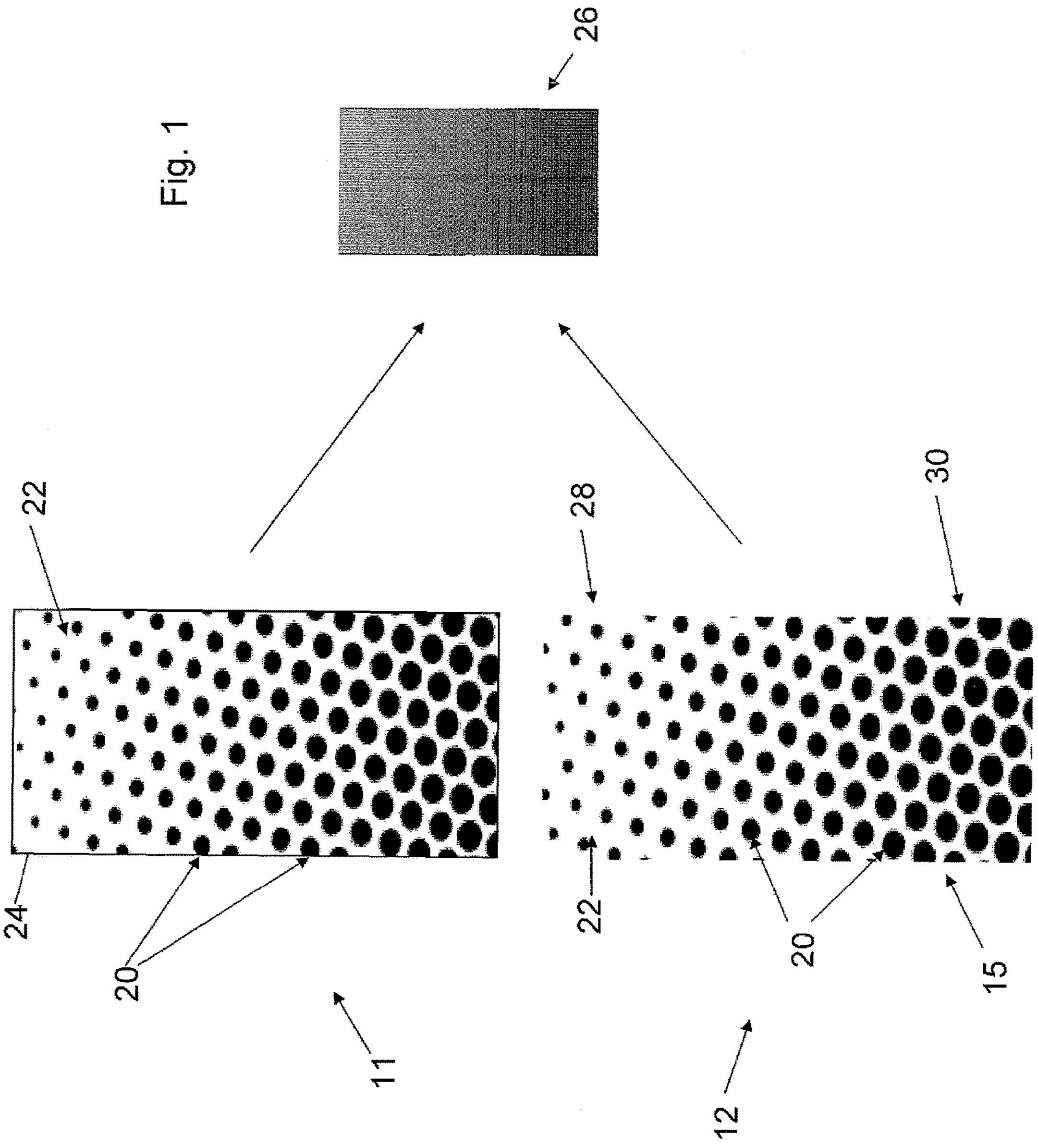
FIG. 1 shows close up and distant views of one embodiment of a screen of opaque elements such as described in accordance with the present invention.

As shown in FIG. 1, when viewed up close as indicated at 11 and 12, opaque ink elements 20 such as dots can be clearly delineated and distinguished from white space 22 that separates them. The ink elements 20 can be printed on a layer of material, such as a transparent film 24, or can be part of a screen or pattern 15 printed directly on an underlying surface or substrate, such as paper, cardboard or other surface or substrate. Depending upon the size and density level of the ink elements, and the distance from which the ink elements are viewed, any design, pattern and/or indicia underneath or on top of the ink elements can either be clearly viewable, partially viewable or not viewable. For example, the upper portion 28 of the screen 15 in FIG. 1 contains a less dense pattern of ink elements 20 than the lower portion 30 of the screen 15. As light strikes the opaque elements, none of it passes through. Most if not all of the light is reflected by the elements. However, when viewed from a distance, as indicated at 26, the ink elements 20 can provide a shaded or colored background to whatever surface they are applied.

As a result, any indicia appearing on the surface or substrate to which the screen 15 is printed may be fully viewable, but potentially viewable in greater clarity to the extent the indicia appears on or under any portion of the screen that is less dense, i.e., where there are fewer or smaller opaque elements. Using a screen of opaque ink elements thus permits one to employ a wide range of colors, designs and security measures, depending upon the intended use and/or game associated with various types of game cards. It will be appreciated that game cards as used in the present disclosure can include lottery tickets, scratch-off instant tickets and/or extended play games, Bingo games, Crossword games, promotional games, game cards tied to movies and television shows and other card applications that employ removable surfaces.

Figure 2:
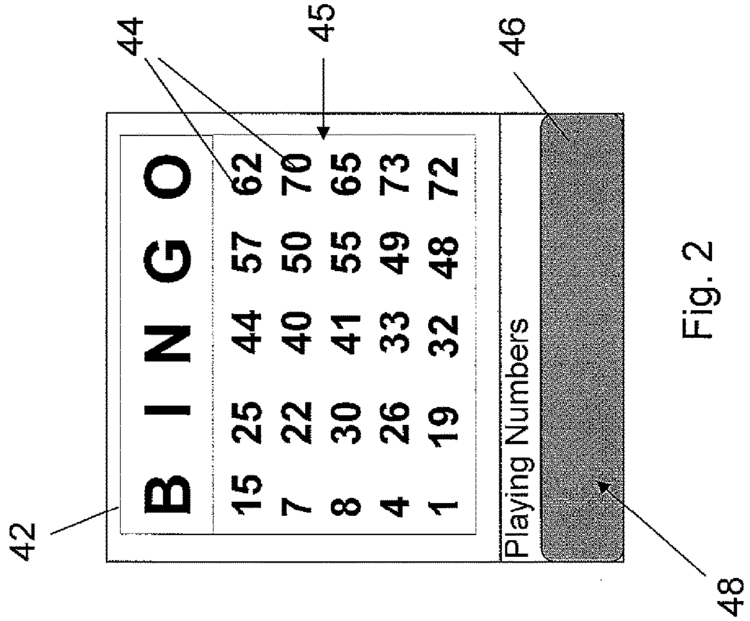
FIG. 2 shows a sample game card that can be adapted for use with the present invention.

FIG. 2 shows a playing card 42 to which the marking system of the present invention can be applied. As shown in FIG. 2, the playing card includes printed indicia 44 in the form of numbers on a playing area 45, and an opaque scratch covering 46 on top of a call area 48 of the card. This game can be played by a player scratching a portion of the covering 46 over the call area 48 to reveal a "called" number. If any of the indicia in the play area match the called number, then the player can mark that indicia on the play area, indicating it has been called. In the Bingo game illustrated on the card 42, the player may have the goal of marking a set of five indicia either vertically, horizontally or diagonally to win the game.

Figure 3:
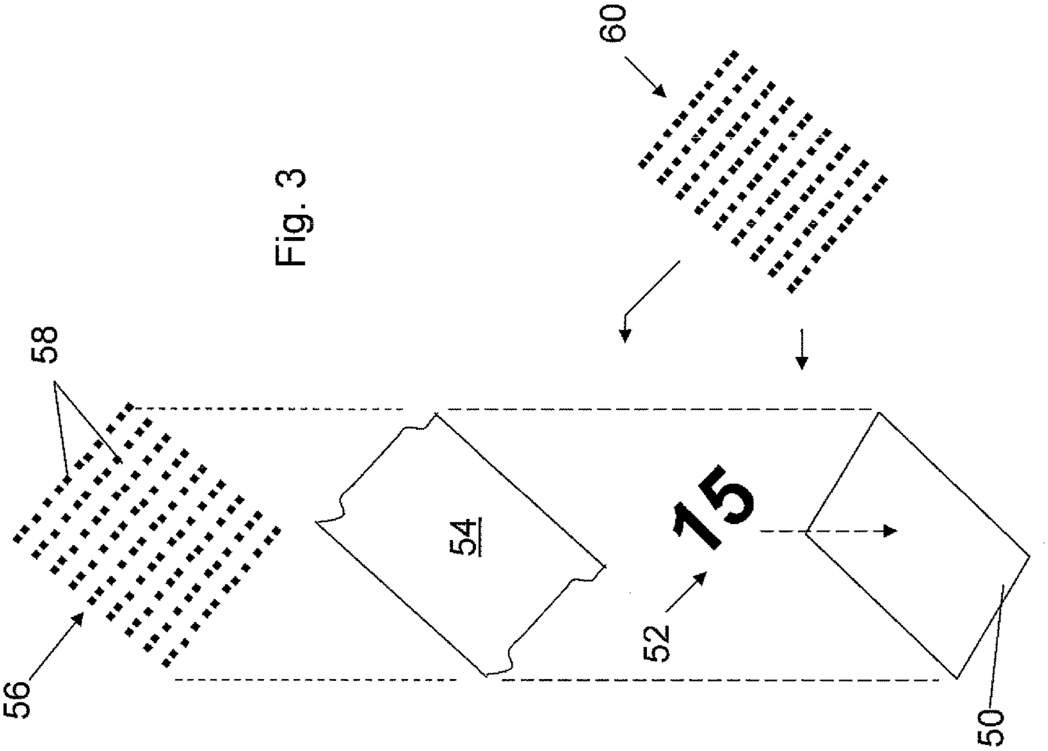
FIG. 3 shows a schematic exploded view of one embodiment of a game card incorporating elements of the marking system of the present invention.

FIG. 3 shows a schematic exploded view of one embodiment of a game card incorporating elements of the marking system of the present invention. It will be appreciated that the view in FIG. 3 can also represent just a portion of a game card. As shown therein, a substrate or portion of a substrate 50 is provided on which elements of the present invention will be added. The substrate 50 can be cardboard, paper, foil, coated board or other material known to be applied to game card/lottery ticket type applications. The substrate can be colored or can have a colored layer applied thereto, as described more completely, for example, with respect to FIG. 7 below. Indicia 52 are then printed onto the substrate using printing methods such as, for example, ink jet printing, flexographic printing and digital printing techniques other than ink jet printing. Such digital printing techniques can include the use of solid and liquid toner digital printing machines, for example. In the example shown in FIG. 3, the indicia 52 is the number fifteen. A removable layer 54 of material (i.e., a "release" layer) is then provided on top of the indicia 52 and the substrate 50. In one embodiment of the present invention, as illustrated and described with respect to FIG. 7 below, for example, a separate varnish layer is applied before the removable layer 54 to protect the indicia from damage or removal when the game card is scratched. The material used for the removable layer 54 can be a water-based varnish or a rubber-based material as known in the art, such that the layer can be rubbed or scratched off. In one embodiment of the present invention, the removable layer 54 is a UV curable clear varnish. The removable layer 54 for use with the present invention is preferably transparent, and can be applied using flexographic printing, rotogravure printing or other known method, such as, for example, by application of silk screen technology. An overlying screen 56 comprising a pattern of opaque ink elements 58 is then printed onto the layer 54. The overlying screen 56 can be applied using similar printing techniques used in applying the removable layer, and can employ pantone matching system (PMS) ink, for example. In one embodiment of the present invention, the screen 56 is printed such that the ink elements are blended into smooth tones when viewed by the human eye and allow the indicia 52 to be entirely visible or at least partially visible therethrough. Optionally, an underlying screen 60 comprising a pattern of opaque ink elements is printed either on the substrate 50 and under the indicia 52 or over the indicia and the substrate together, as indicated by the different arrows in FIG. 3. The underlying screen 60 can provide a perceived smooth background color around the indicia that is different from and combines with the overlying screen color to produce a blended color appearance around the indicia. Thus, when the removable layer 54 is removed along with the portion of the overlying screen 56, the remaining background color appearance of the underlying screen 60 will ideally be easy to differentiate from the blended color appearance around the remaining indicia where the removable layer has not yet been removed.

In one embodiment of the present invention, the pattern of opaque ink elements 20 is comprised of substantially circular dots. In another embodiment of the present invention, the pattern of opaque ink elements 20 is comprised of elements having substantially non-circular shape, such as rectangular, star-shaped, oval or other shape. Providing differently shaped ink elements permits different designs, colors and shading to be employed. It is within the realm of possible applications of the present invention to provide a screen having a pattern of ink elements including different shaped elements such as, for example, some circular dots and some star-shaped elements. In one embodiment of the present invention, the pattern of opaque ink elements forms one or more symbols, letters, words or security marks. In a particular embodiment, the word or security mark is formed such that it is only visible under a microscope, thereby making it difficult to recreate or copy.

In another embodiment of the present invention, one or more individual ink elements are printed in the form of a symbol, letter, word or security mark. These shapes and designs can be employed for security, aesthetics and/or to emphasize the card's theme based on the particular game being played. For example, if the game card has a poker theme, one or more individual ink elements can be shaped in the form of a diamond. Alternatively, the game card can be designed with one or more ink elements in the shape of a diamond and one or more ink elements in the shape of a heart. As a further example, the game card can be designed with some ink elements printed as red diamonds, some printed as red hearts, some printed as black clubs and some printed as black spades.

The density of the screen 56 is determined and reflected by the number, shape and size of the ink elements. More particularly, the density of the screen is a ratio of the opaque and clear elements in a given area. By way of example, an area having an opacity or density of thirty percent would have thirty percent of its area covered by an evenly distributed opaque material, and the remaining would be seventy percent clear. Accordingly, in one embodiment of the present invention, the screen 56 can have a pattern density of approximately eighty percent or less to permit the clearest and sharpest views of any underlying indicia. In another embodiment of the present invention, the screen 56 can have a pattern density of between approximately twenty percent and approximately sixty percent, inclusive.

In one embodiment of the present invention, a single overlying screen 56 is provided with a density that varies depending upon the area of the screen involved, as described above with regard to screen 15 of FIG. 1. In one embodiment of the present invention where it is desirable to provide a screen that only permits partial viewing of the indicia, the overlying screen can include a first pattern portion with a density of over thirty percent and a second pattern portion with a density of approximately thirty percent or less. The portion of the indicia underneath the first pattern portion of the screen would thereby be less visible or not visible at all. Such an embodiment can be incorporated as a security feature to prevent fraud in some implementations of the present invention.

Figure 4:
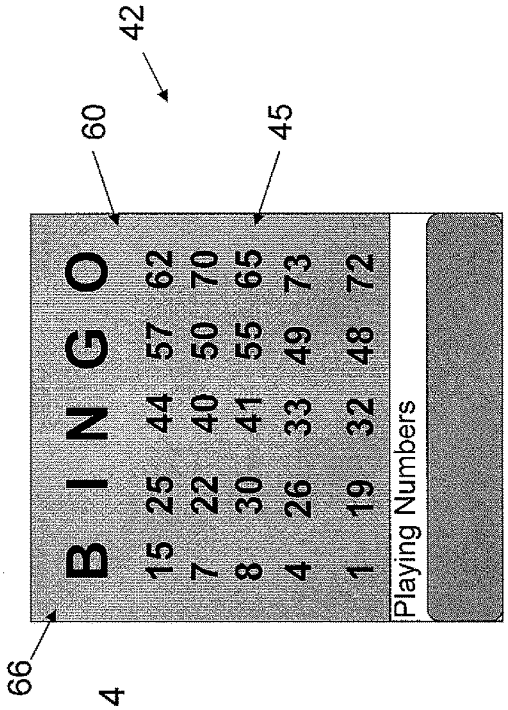
FIGS. 4 through 6 show the sample game card in FIG. 2 incorporating different elements of the marking system of the present invention and at different stages of production and/or use.
Figure 6:
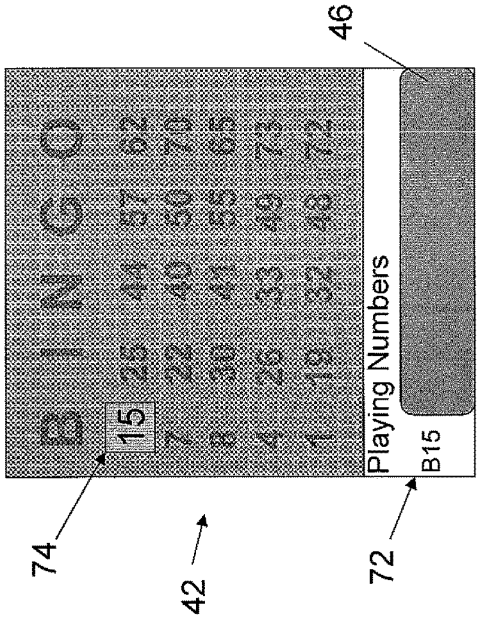
Figure 5:
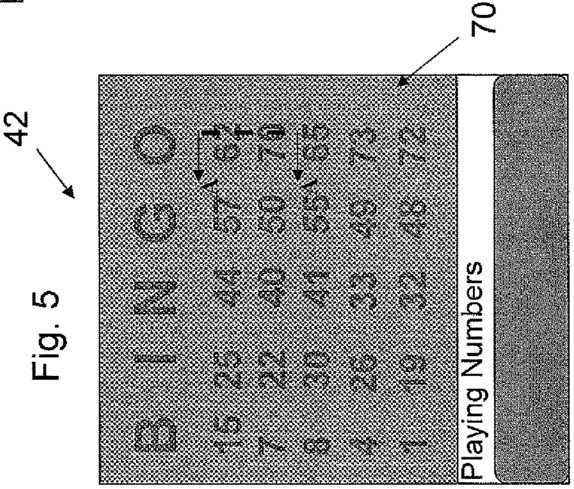

FIGS. 4 through 6 illustrate different aspects of one embodiment of the present invention as applied to the game card of FIG. 2. FIG. 4 shows the embodiment of the card 42 without an overlying screen, but with an underlying screen as depicted by arrow 60. While the underlying screen 60 is shown across the play area 45 and game title area 66, it will be appreciated that the underlying screen may by applied only to the play area or even select portions of the play area depending upon the game and embodiment of the invention involved. FIG. 5 shows the embodiment of the card from FIG. 4, but wherein the overlying screen is printed on the card 42. The removable layer is not shown but is present in FIGS. 5 and 6. Optionally, other layers, screens and/or indicia can be applied as described, for example, in connection with FIGS. 7 through 9 below. Also, the overlying screen combines with the underlying screen to present the blended color or shade depicted by arrow 70. As with FIG. 4, it will be appreciated that the overlying screen may be applied only to the play area or select portions of the play area, and may comprise any of the above-described embodiments. The overlying screen, whether combined with an underlying screen or not, allows the player's eyes to be fooled into thinking there is a colored layer on top of the symbols when in reality there is only a pattern of relatively tiny shapes as described.

FIG. 6 shows the embodiment of the card from FIG. 5, but wherein the call "B15" has been revealed for play as indicated by reference numeral 72. The revealing of this call takes place upon the scratching or other removal of the opaque scratch covering 46, which can comprise a removable covering material as described elsewhere herein. Since the play area of the card 42 includes a match for the called "B15", the area over the "15" portion of the card has been scratched or otherwise removed, thereby revealing the indicia as indicated at 74 with the background coloring or shading provided only by the underlying screen 60. In this way, the player can tell that "B15" has been called on his or her card, and can continue playing in the hopes of completing enough marked call areas to win the game.

Figure 7A:
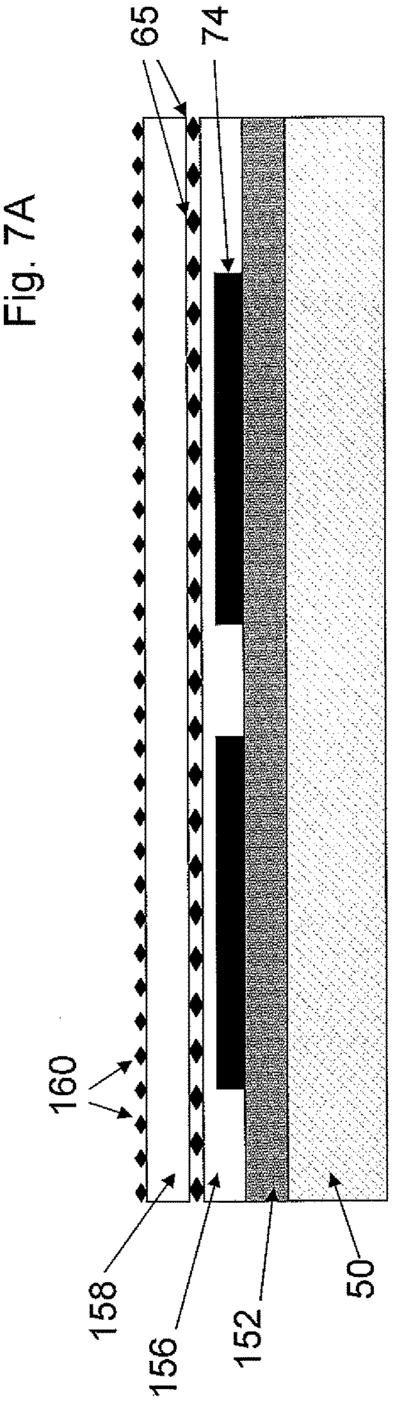
FIG. 7A shows a cross sectional view of one embodiment of the present invention taken substantially along the line A-A of FIG. 5.
Figure 7B:
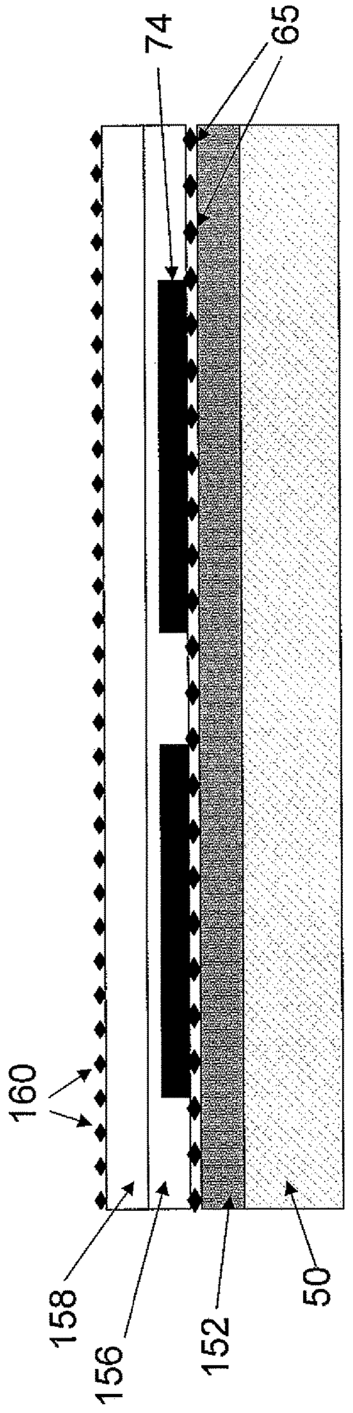
FIG. 7B shows a cross sectional view similar to the view in FIG. 7A of a further embodiment of the present invention.
Figure 8:
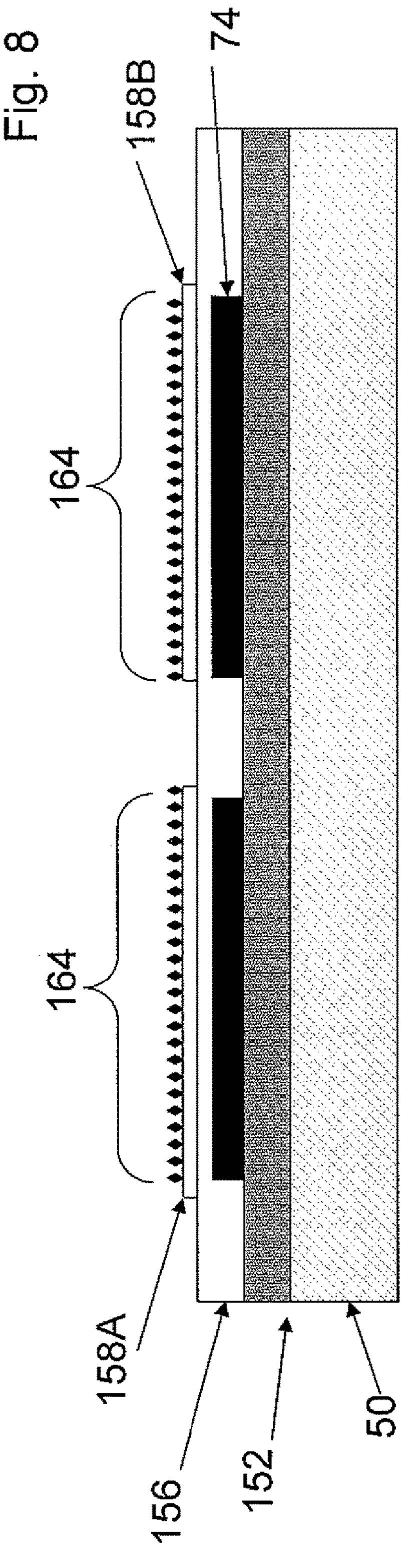
FIG. 8 shows a cross sectional view similar to the view in FIG. 7A of a further embodiment of the present invention.
Figure 9:
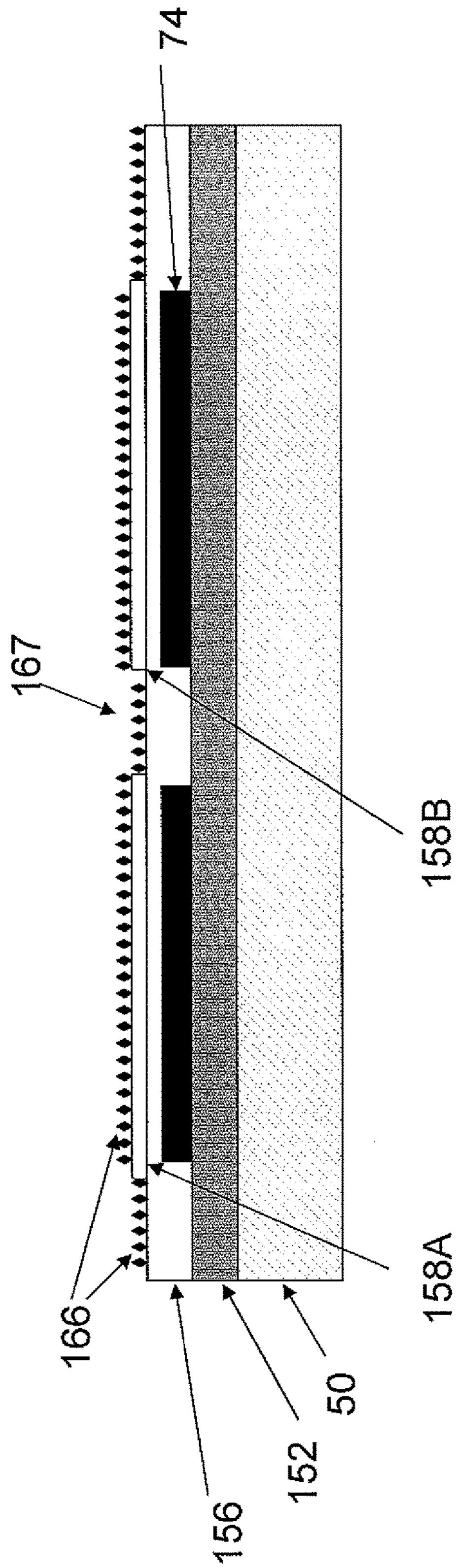
FIG. 9 shows a cross sectional view similar to the view in FIG. 7A of a further embodiment of the present invention.

FIG. 7A shows a cross sectional view of one embodiment of the present invention taken substantially along the line A-A of FIG. 5. FIGS. 7B, 8 and 9 show similar cross-sectional views to FIG. 7A of embodiments of the present invention that are different from the embodiment shown in FIG. 7A. It will be appreciated that the elements in FIGS. 7A through 9 are not to scale, but may be exaggerated for ease of reference. As shown in the embodiment of the present invention shown in FIG. 7A, a base color layer 152 is shown atop a card substrate 50. The base color layer 152 can have or comprise a color that is taken from the group consisting of: a foil, a fluorescent ink, a thermochromic ink, a pearlescent ink, an encapsulated ink, a solid opaque colored ink, a fragrance encapsulated ink, a glow-in-the dark ink, an ultraviolet (UV) sensitive ink, a UV fluorescent ink or a PMS color, for example. The base color layer provides the present invention with the ability to present clearer, more vibrant colors as described hereinafter. Indicia 74 are printed atop the base color layer 152 as described above. A protective varnish 156 is then applied to help prevent the indicia 74 from being scratched or otherwise damaged during game play. The underlying screen elements 65 are shown above the protective varnish 156, and the removable layer (i.e., the release layer) 158 is shown atop the screen elements 65. The overlying screen elements 160 are shown atop the removable layer 158. FIG. 7B illustrates the embodiment of the present invention where the underlying screen elements 65 are shown beneath the indicia 74 as well as beneath the removable layer 158. The substrate 50, base color layer 152, varnish 156 and overlying screen elements 160 are also present in the embodiment in FIG. 7B as shown.

In one embodiment of the present invention, a single removable layer 158 is printed over all of the indicia in a play area, and a single screen 160 is printed over the single removable layer. The removable layer can be of a material and application that permits removal in portions or segments. Thus, in the embodiment where a single removable layer is applied over the indicia, a portion of the removable layer can be scratched, rubbed or otherwise removed above one or more indicia without removing the entire removable layer. The removal of a portion of the removable layer results in the removal of a portion of the screen in this embodiment of the present invention.

In another embodiment of the present invention, as illustrated in FIGS. 8 and 9, for example, an individually removable layer (i.e., a punch-out release layer) is applied above each individual indicia in the play area. When an individual removable layer is said or shown to cover an individual indicia or one of a plurality of indicia, it will be appreciated that the indicia being covered can be a single digit or character such as a letter or one-digit number, for example, or the indicia can be a multi-digit number, word or other representation of indicia. In this way, the present invention contemplates that an individual removable layer (i.e., individual punch-out release layer) can cover the entire word "dog" in a word game, for example, or can cover just one of the letters "d", "o" or "g" in the word "dog". The word "dog" can be considered an individual indicia, and each letter can separately be considered an individual indicia.

As shown in FIG. 8, each individual indicia 74A and 74B, has an individually removable layer 158A and 158B, respectively, applied thereabove. For the full play area, the series of punch-out release elements are disposed between the indicia and the overlying screen layer. The optional underlying screen is not shown in FIG. 8, but it will be appreciated that an underlying screen similar to that described and shown at 60 in FIG. 3 or FIG. 4 or at 65 in FIG. 7A or FIG. 7B can be employed in this embodiment of the present invention. As shown in FIG. 8, individual overlying screens 164 are applied atop the individually removable layers. In the embodiment of the present invention as shown in FIG. 9, a single screen 164 can be applied across all of the individual removable layers. In at least the FIG. 9 embodiment of the present invention, it will be appreciated that the overlying screen elements 166 can overlap the removable layers 158A and 158B such that removal of any of the removable layers or a portion thereof may not completely remove the overlying screen element 166. In this way, the color of the overlying screen can still appear in the spaces (e.g., 167 in FIG. 9) between adjacent indicia for added contrast with the background of the card or ticket that appears after the removable layer has been removed. In other words, there is a visible distinction between the base color layer 152 (or substrate area in the embodiment with no base color layer) where the portion of the overlying screen has been removed and the base color layer 152 (or substrate area in the embodiment with no base color layer) where the portion of the overlying screen has not been removed.

Each punch-out release element can take any desired shape capable of being printed, such as, for example, a sun, a moon, a star, a heart, a clover, a Christmas stocking, etc., so that appropriately themed tickets can be created.

In one embodiment of the present invention, multiple overlying screens are provided. For example, a first and second overlying screen can be provided wherein the color of the ink elements of the first overlying screen is different from the color of the ink elements of the second overlying screen. Further, the first overlying screen can be of a different density than the second overlying screen, or the first overlying screen can have a pattern of smaller ink elements than the ink elements in the second overlying screen pattern.

In the embodiment of the present invention with an underlying screen 60, the underlying screen can be provided so as to match the overlying screen(s) in density, or can be provide with a different density from the overlying screen(s). This is illustrated, for example, in FIGS. 7A and 7B, where the aggregate of underlying screen elements 65 have a different density from the overlying screen elements 160. Further, the ink elements of the underlying screen pattern can be either substantially aligned or substantially unaligned with the ink elements of the overlying screen pattern. FIGS. 7A and 7B illustrate embodiments of the invention where the overlying screen elements 160 are substantially unaligned with the underlying screen elements 65.

In another embodiment of this aspect of the present invention, the ink elements of the underlying screen pattern can be either of the same type or a different type as the ink elements of the overlying screen pattern.

The present invention thus provides for various arrangements and optional inclusions of screen elements, indicia, a release layer and a base color layer as described above. Accordingly, game providers and ticket printers can select the most desirable combination of these elements depending upon the game involved. Further, the end users of the tickets benefit from a more aesthetically pleasing game ticket with better clarity and color contrast than previously available.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A scratch off game card, comprising:

a substrate having at least one area with printed indicia thereon;

at least one removable layer covering at least a portion of the printed indicia; and at least one overlying screen comprising a pattern of opaque ink elements printed on the at least one removable layer such that the ink elements are blended into smooth tones when viewed by a human eye at a distance and thereby allow the indicia to be at least partially visible.

2. The game card of claim 1 wherein the pattern of opaque ink elements is comprised of substantially circular dots.

3. The game card of claim 1 wherein the pattern of opaque ink elements is comprised of substantially non-circular elements.

4. The game card of claim 1 wherein the at least one overlying screen has a pattern density of approximately eighty percent or less.

5. The game card of claim 1 wherein the at least one overlying screen has a pattern density of between approximately twenty percent and approximately sixty percent, inclusive.

6. The game card of claim 1 wherein the at least one overlying screen includes a first pattern portion with a density of over thirty percent and a second pattern portion with a density of approximately thirty percent or less.

7. The game card of claim 1 wherein the at least one removable layer can be removed in portions, and wherein removal of a portion of the at least one removable layer results in removal of a portion of the screen.

8. The game card of claim 1 wherein the printed indicia comprise a plurality of individual indicia, and wherein the at least one removable layer comprises a plurality of removable layers, with a respective one of the plurality of removable layers covering a respective one of the plurality of individual indicia, and further wherein the at least one overlying screen is printed on the plurality of removable layers such that removal of one of the plurality of removable layers removes only a portion of the at least one overlying screen.

9. The game card of claim 8, wherein a base color layer is applied atop the substrate, and wherein removal of one of the plurality of removable layers provides a visible distinction between the base color layer where the portion of the at least one overlying screen has been removed and the base color layer where the at least one overlying screen has not been removed.

10. The game card of claim 8 wherein a base color layer is applied atop the substrate and an underlying screen comprising a pattern of opaque ink elements is printed over the base color layer, and wherein removal of one of the plurality of removable layers provides a visible distinction between the underlying screen where the portion of the at least one overlying screen has been removed and the underlying screen where the at least one overlying screen has not been removed.

11. The game card of claim 1 wherein the removable layer is transparent.

12. The game card of claim 1 including at least a first and second overlying screen, wherein the ink elements of the first overlying screen are of a first color that is different from the ink elements of the second overlying screen.

13. The game card of claim 1 including at least a first and second overlying screen, wherein the first overlying screen is of a different density than the second overlying screen.

14. The game card of claim 1 further including an underlying screen comprising a pattern of opaque ink elements printed on the substrate underneath the at least one removable layer such that the ink elements are blended into smooth tones when viewed by a human eye at a distance and thereby allow the indicia to be at least partially visible.

15. The game card of claim 14 wherein the underlying screen is further printed underneath the printed indicia.

16. The game card of claim 14 wherein the underlying screen matches the at least one overlying screen in density.

17. The game card of claim 14 wherein the ink elements of the underlying screen pattern are substantially aligned with the ink elements of the overlying screen pattern.

18. The game card of claim 14 wherein the ink elements of the underlying screen pattern are substantially unaligned with the ink elements of the overlying screen pattern.

19. The game card of claim 14 wherein the ink elements of the underlying screen pattern are of a type that is the same as the ink elements of the overlying screen pattern.

20. The game card of claim 14 wherein the ink elements of the underlying screen pattern are of a type different from the ink elements of the overlying screen pattern.

21. The game card of claim 1 further including a base color layer printed on the substrate underneath the printed indicia.

22. The game card of claim 21 wherein the base color layer has a color that is selected from the group of colors consisting of: a foil, a fluorescent ink, a thermochromic ink, a pearlescent ink, an encapsulated ink, a solid opaque colored ink, a fragrance encapsulated ink, a glow-in-the dark ink, an ultraviolet sensitive ink, an ultraviolet fluorescent ink.

23. The game card of claim 1 wherein the pattern of opaque ink elements forms one or more of a symbol, a letter, a word, a logo or a security mark.

24. The game card of claim 1 wherein at least one ink element comprises a symbol, a letter, a word, a logo or a security mark.

25. A method for printing a marking system on a game card, comprising:

printing indicia on a game card;

printing at least one removable layer covering at least a portion of the printed indicia; and printing at least one overlying screen comprising a pattern of opaque ink elements on the at least one removable layer such that the ink elements are blended into smooth tones when viewed by a human eye at a distance and thereby allow the indicia to be at least partially visible.

26. A game card marking system, comprising:

at least one layer of varnish or rubber-based material that is removable when applied to a substrate; and at least one overlying screen comprising a pattern of opaque ink elements on the at least one removable layer such that the ink elements are blended into smooth tones when viewed by a human eye at a distance.

27. The game card of claim 1, wherein the at least one overlying screen is printed on the at least one removable layer so as to allow the indicia to be at least partially visible without removing the removable layer.

28. The game card of claim 1, wherein the at least one overlying screen is printed on the at least one removable layer so as to allow the indicia to be at least partially visible through the at least one overlying screen.

* * * * *